(12) United States Patent
Sartain et al.

(10) Patent No.: US 7,079,263 B2
(45) Date of Patent: Jul. 18, 2006

(54) METHOD AND APPARATUS FOR ON-LINE LOG DIAMETER MEASUREMENT AND CLOSED-LOOP CONTROL

(75) Inventors: Kevin B. Sartain, Broken Arrow, OK (US); Kevin A. Dewitt, Appleton, WI (US); Wael H. Elgamal, Tulsa, OK (US); Richard M. Urquhart, Broken Arrow, OK (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 374 days.

(21) Appl. No.: 10/172,799

(22) Filed: Jun. 14, 2002

(65) Prior Publication Data

US 2003/0231318 A1 Dec. 18, 2003

(51) Int. Cl.
*G01G 11/02* (2006.01)

(52) U.S. Cl. ........................................ 356/635; 356/431
(58) Field of Classification Search ................ 356/635, 356/429, 430, 431
See application file for complete search history.

(56) References Cited

U.S. PATENT DOCUMENTS

| | | | | |
|---|---|---|---|---|
| 3,724,958 A | * | 4/1973 | Callan ......................... | 356/639 |
| 4,120,403 A | * | 10/1978 | Stephanos ................... | 209/564 |
| 4,528,631 A | | 7/1985 | Bogucki-Land | |
| 4,913,366 A | | 4/1990 | Andou | |
| 5,060,881 A | | 10/1991 | Bogucki-Land | |
| 5,291,272 A | * | 3/1994 | Demirsu ...................... | 356/639 |
| 5,867,275 A | * | 2/1999 | Curtis et al. ................ | 356/635 |
| 5,884,682 A | * | 3/1999 | Kennedy et al. ............ | 144/357 |
| 5,930,734 A | | 7/1999 | Hofmann et al. | |
| 6,168,679 B1 | | 1/2001 | Biagiotti | |
| 6,234,075 B1 | | 5/2001 | Kayser | |
| 6,705,363 B1 | * | 3/2004 | McGehee et al. ........... | 144/357 |
| 6,858,836 B1 | * | 2/2005 | Hartrumpf ................... | 250/234 |

FOREIGN PATENT DOCUMENTS

| | | |
|---|---|---|
| DE | 3709598 A | 10/1988 |
| DE | 19806288 | 8/1999 |
| EP | 0845655 | 6/1998 |
| EP | 0871008 A2 * | 10/1998 |
| EP | 0871008 A3 | 10/1999 |
| GB | 2063826 | 6/1981 |

OTHER PUBLICATIONS

PCT Search Report dated Sep. 9, 2003.
PCT Search Report date of mailing Dec. 5, 2003.

* cited by examiner

*Primary Examiner*—Gregory J. Toatley, Jr.
*Assistant Examiner*—Roy M. Punnoose
(74) *Attorney, Agent, or Firm*—Dority & Manning, P.A.

(57) ABSTRACT

A measurement system for measuring a parameter of a log is provided. A measuring device produces an emission in a direction of the log. A portion of the emission measures the parameter, such as log diameter, and communicates the diameter to the measuring device, which in turn communicates the diameter to a controller to selectively adjust converting equipment to vary the diameter.

50 Claims, 3 Drawing Sheets

METHOD AND APPARATUS FOR ON-LINE LOG DIAMETER MEASUREMENT AND CLOSED-LOOP CONTROL

BACKGROUND OF THE INVENTION

In a manufacturing system for the production of paper products such as paper towels, a log of rolled, non-woven, fibrous paper web product is produced and eventually cut into consumer-size rolls for packaging. Various characteristics of the log are critical to the operation of downstream packaging equipment. For example, if the diameter of the log becomes too large, the excessive diameter can cause the packaging equipment to operate inefficiently and possibly malfunction. On the other hand, if the diameter of the finished product is too small, it may adversely affect a consumer's perception of quality and value of the final product, thus negatively impacting sales of the product.

Log diameter is presently measured manually by an operator in which the operator checks the diameter at defined time intervals. If the operator's manual measurements indicate that the diameter falls outside of a desired range, the operator manually adjusts appropriate portions of the manufacturing equipment to increase or decrease the diameter as required.

By way of example, the operator can measure the log manually using wheels and skids, which contact the log to take diameter, firmness and other log measurements. Based on these measurements, the operator makes appropriate adjustments in the manufacturing process to alter the log diameter. Unfortunately, some system adjustments require starting and stopping the system while incremental adjustments and measurements are conducted until the operator determines that the log diameter is within tolerance.

The variation in the process means that single measurements are not necessarily characteristic of the actual diameter average, and since these process variables can not be completely controlled, non-uniform finished rolls, which are undesirable both to the manufacturer and to the consumer, are typically produced.

Various approaches to measure the log diameter without physical contact or operator intervention have been attempted. One approach incorporates a number of lasers to triangulate the log diameter using a plurality of laser beams, which are specifically directed at the log to measure distances from a surface of the log. These laser beams typically penetrate the log at least slightly and produce inaccurate measurements. Moreover, installation and calibration of the triangulating lasers tend to be more complicated and time consuming than desired.

SUMMARY OF THE INVENTION

According to the present invention, a measurement system for measuring a parameter of a log of material in a web manufacturing and packaging system is provided. More specifically, a laser measuring device measures the log as the log travels from converting equipment after production by a converting winder before the log reaches packaging equipment downstream. The log may be any material such as a non-woven polymer material, an airlaid material, a paper material and the like, although for sake of discussion, paper web material generally is referred to herein but is in no way intended to limit the scope of the invention. Moreover, the invention does not depend on any absolute measurement because the laser measuring device is only sensing an amount of a laser beam being blocked, which is converted directly into the parameter, such as log diameter.

The component parts of the invention are simple, reliable, and economical to manufacture, assemble and use. Other advantages of the invention will be apparent from the following description and the attached drawings or can be learned through practice of the invention.

In one embodiment of the invention, a laser measuring device emits a focused beam of light such as a laser beam from a laser transmitter transmitting in the direction of a log as the log moves along a system conveyor. While a portion of the laser beam is blocked by the log, another portion of the emitted beam is received by a laser receiver. The measuring laser beam may be produced by a gas laser, a solid-state laser, a liquid laser, a chemical laser, a semiconductor laser, and the like as known in the art, but in any case, it is a non-penetrating laser beam. Due to the repeatability and accuracy provided by the non-penetrating laser beam measurement, a uniform rolled product can be consistently produced.

A logic controller in this embodiment measures and converts the blocked portion of the laser beam into the log diameter. Specifically, the controller compares the measured log diameter to a target setpoint diameter to determine if system settings must be changed to meet the setpoint diameter. Modifiable system settings for changing the diameter and other log characteristics include a winding log speed profile, calendering level, sheet tension or draw, or the like.

The controller can be programmed with a statistical process control rule for comparison of the measured log diameter to a target diameter based on measurements of a specific number of logs or multiple samplings taken from a single log. For instance, after approximately six measurements, if the log diameter is determined to be out of tolerance from the target diameter, the controller will automatically send control signals to adjust the system to change subsequent log diameters.

In one aspect of the invention, a winder operator panel, which is in communication with the controller, may be provided to display the parameter to the operator. The winder operator panel may be used to program the controller to change a rate of laser emission samplings, to change a set value of the parameter, to override a line setting in the converting equipment to alter the parameter and so forth.

In accordance with another aspect of the invention, in some ways similar to the single laser transmitter embodiment, a plurality of laser emitters and a plurality of laser receivers are provided. The laser emitters and receivers are disposed apart from each other adjacent the conveyor for measuring various sizes of logs or grades in which diameters differ by more than ½ inch. Therefore, in lieu of adjusting the single laser emitter and single laser receiver to accommodate different diameter products, multiple sets of emitters and receivers are provided.

In this embodiment, at least one emitter-receiver set is positioned at a height above or below at least one other emitter-receiver set. Accordingly, when a log with a specific setpoint diameter is substituted for a log having a different setpoint diameter, a program in the controller will automatically switch the system to utilize the emitter-receiver set appropriately positioned to measure the substitute log. Therefore, a single emitter-receiver set does not have to be constantly adjusted to accommodate separate grades of logs.

In another aspect of the invention, a method of measuring a paper log in a nonwoven fibrous web manufacturing machine is disclosed. The method includes the steps of moving the paper log along the conveyor; lasing the paper log by the laser beam similar to the previous description in which a first portion of the laser beam is blocked by the paper log and a second portion of the laser beam is received by a receiver disposed apart from the emitter; converting the second portion into the diameter; and adjusting via a closed-loop program a line setting for a finishing station in the web manufacturing machine to adjust subsequent log diameters incrementally and/or in real-time.

Additional features and advantages of the invention will become apparent to those skilled in the art upon consideration of the attached drawings in conjunction with the following detailed description of the drawings, which exemplifies the best mode of carrying out the invention as presently perceived, or can be learned through practice of the invention.

BRIEF DESCRIPTION OF THE DRAWINGS

The above and other aspects and advantages of the present invention are apparent from the detailed description below and in combination with the drawings in which.

DETAILED DESCRIPTION OF THE INVENTION

Figure 1:
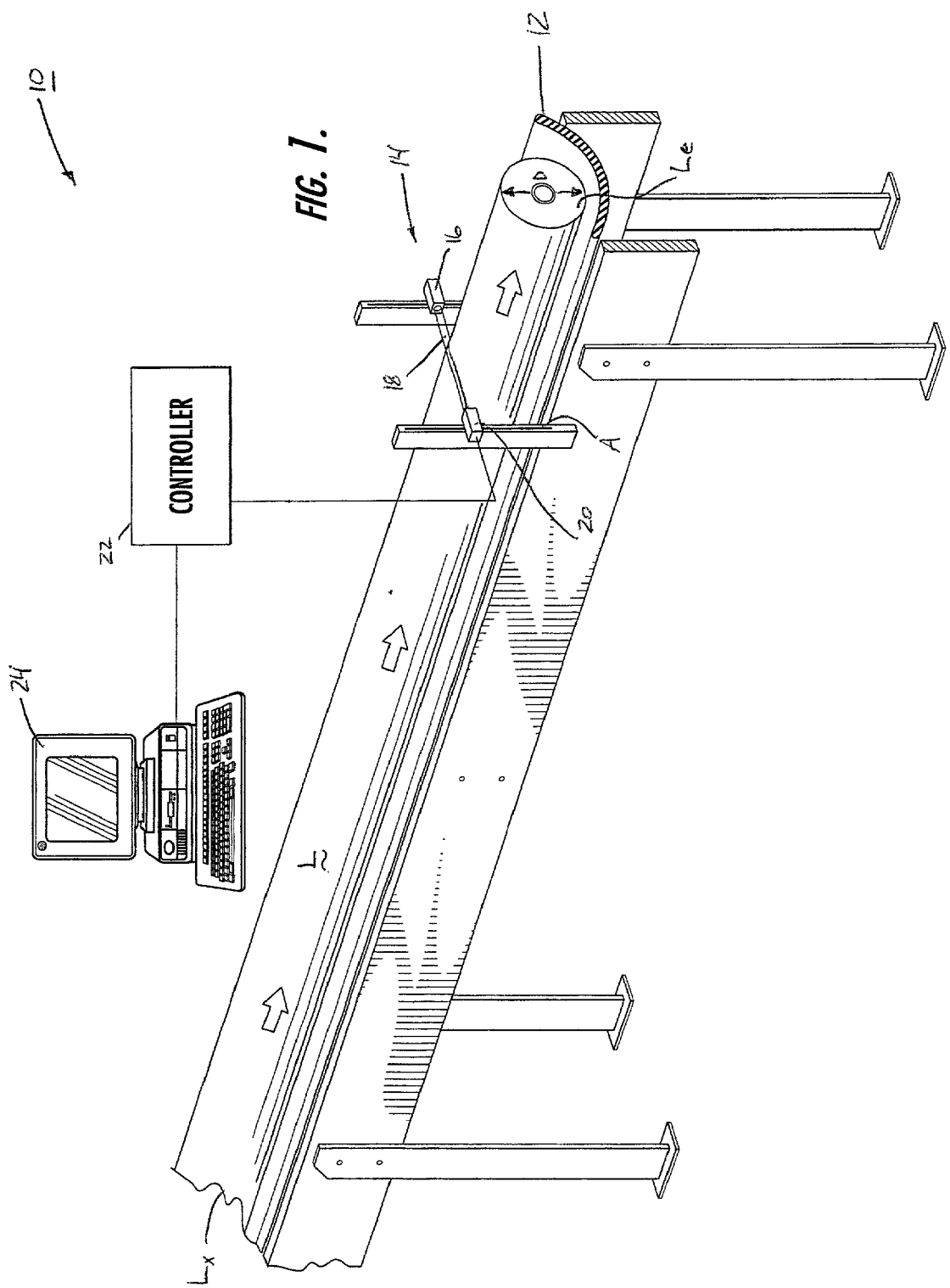
FIG. 1 is a perspective view of a portion of a log manufacturing system showing a laser measuring device according to an aspect of the present invention.

Detailed reference will now be made to the drawings in which examples embodying the present invention are shown. Repeat use of reference characters in the present specification and drawings is intended to represent same or analogous features or elements of the invention.

The drawings and detailed description provide a full and written detailed description of the invention, and the manner and process of making and using it to enable one skilled in the pertinent art to make and use it. The drawings and detailed description also provide the best mode for carrying out the invention. However, the examples set forth herein are provided by way of explanation of the invention and are not meant as limitations of the invention. The present invention thus includes modifications and variations of the following examples as come within the scope of the appended claims and their equivalents.

As broadly embodied in the Figures, a portion of a web manufacturing system for producing a log of non-woven, fibrous paper product is shown. The Figures illustrate a measuring device or measurement system 10 with a conveyor 12 and one or two lasers or laser assemblies 14 for measuring a parameter of the log L. A controller 22 is provided to control periodic or predetermined lasing by the laser assembly 14. The measurement system 10 may have additional or fewer components, and the laser assembly 14 may be arranged in the web manufacturing system other than as illustrated. Therefore, it should be understood that the following examples of the invention are not limited to the arrangements shown in the Figures.

With particular reference to FIG. 1, the measurement system 10 is shown with the log L movably disposed on the conveyor 12. The laser assembly 14 has a laser transmitter or emitter 16 and a laser receiver 20 that are mounted via adjusting devices A to the conveyor 12. In this example, the laser assembly 14 measures a diameter D of the log L as it passes by on the conveyor 12. Seen more particularly in FIG. 2, as the log L passes between the laser emitter 16 and the laser receiver 20, the log L is exposed to an emission or laser beam 18 from the emitter 16, which will be described in greater detail below.

Figure 2:
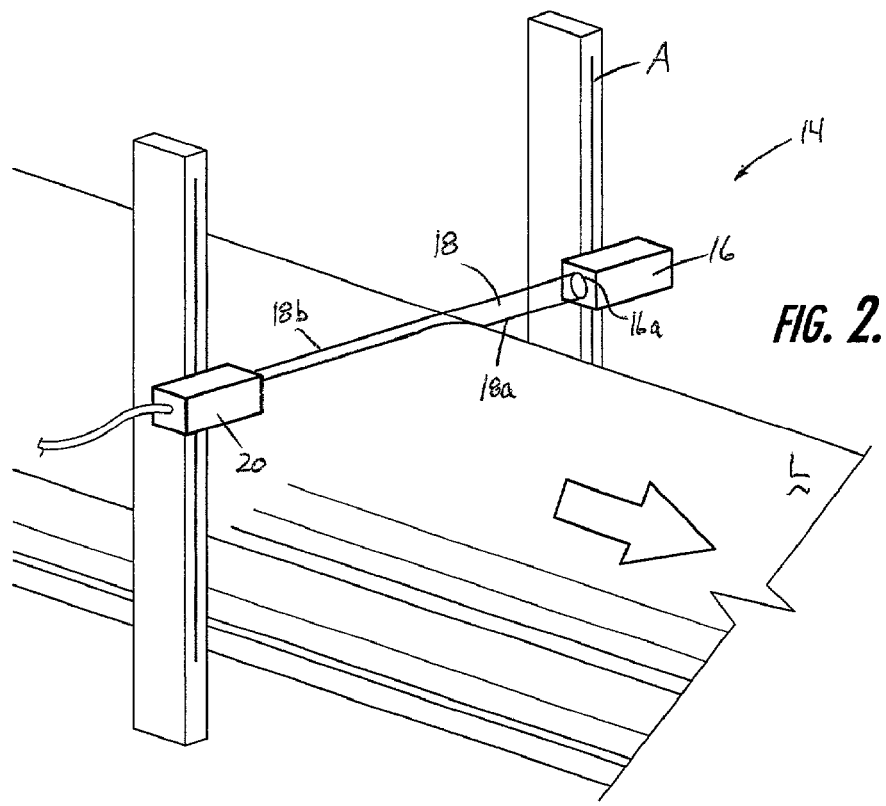
FIG. 2 is a detailed view of an area of FIG. 1 showing a laser in accordance with an aspect of the invention.
Figure 3:
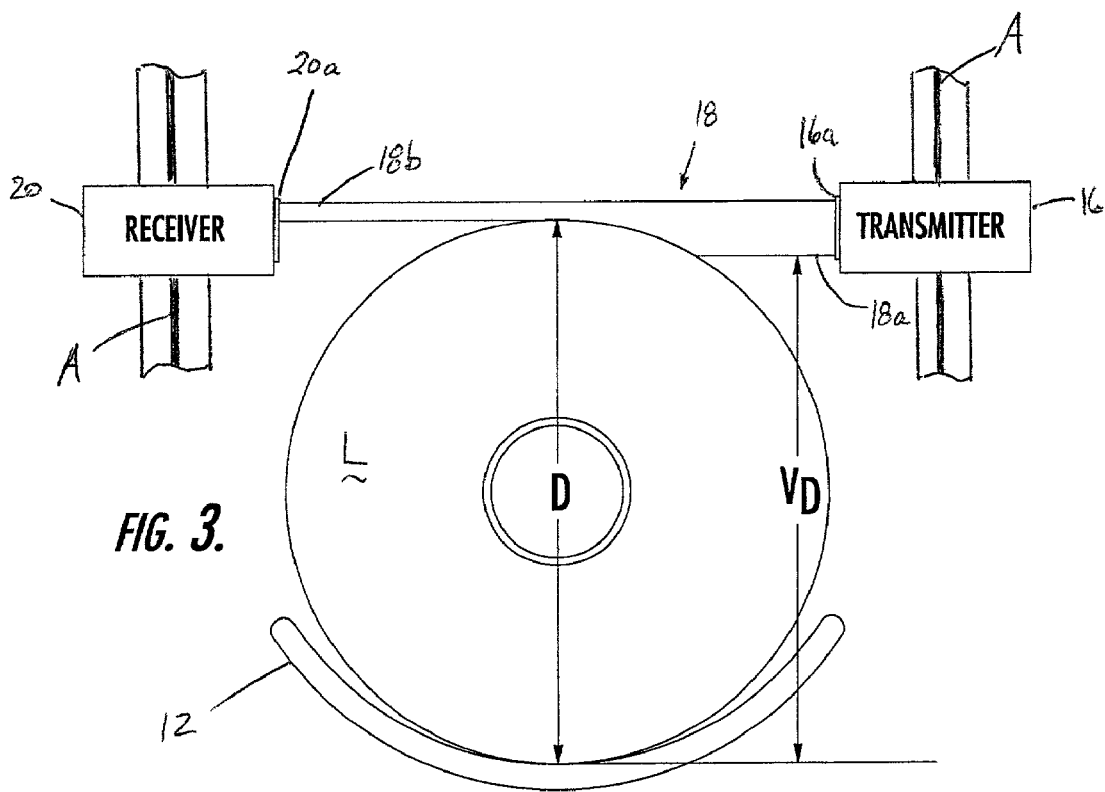
FIG. 3 is an end view of the embodiment of FIG. 1 showing a diameter of a log being measured by a laser beam in accordance with an aspect of the invention.

As seen in FIGS. 2 and 3, the emitter 16 lases the log L with the laser beam 18 to measure the diameter D of the log L as the log L passes between the emitter 16 and receiver 20. The laser beam 18 is between approximately 20 millimeters (about 0.8 inches) to approximately 30.5 millimeters (about 1.2 inches) in height and is a non-penetrating laser beam to avoid penetrating the log L and causing erroneous diameter D readings. Such a non-penetrating beam may be provided by a gas laser, a solid-state laser, a liquid laser, a chemical laser, a semiconductor laser, and the like. For instance, an LMI-LBS Laser Detector from LMI-North American Sales of Southfield, Mich. can be suitably used for purposes of this invention.

By way of example, the laser beam shown in FIGS. 2 and 3 is 24 mm (about 1 inch) in height. Therefore, the diameter D is incrementally measurable based on the receiver 20 receiving from between 0 mm to 24 mm of the 24 mm laser beam 18. More specifically, a portion 18a of the 24 mm laser beam 18 is blocked by the log L while another portion 18b is received by the receiver 20 and converted to the diameter D.

Converting the pass-through or received laser beam portion 18b to the diameter D is accomplished by the laser assembly 14, which sends a 20 milliamp (mA) signal to the controller 22 when no portion 18a is being blocked. In other words, the 20 mA signal is produced if the entire 24 mm laser beam 18 is received by the receiver 20. Similarly, the laser assembly 14 is configured to send a 4 mA signal to the controller 22 when the laser beam 18 is entirely blocked by the log L; i.e., the 4 mA signal equates to 0 mm because no portion 18b is received by the receiver 20. The diameter setpoint of the log L is reached when approximately one-half of the 24 mm laser beam 18 height is blocked by the log L; i.e., when portions 18a and 18b are each approximately 12 mm in height and controller 22 receives a corresponding 12 mA signal.

To ensure the laser assembly 14 is functioning correctly, the emitter 16 can be programmed to emit the laser beam 18 when no log L is on the conveyor 12. Accordingly, the receiver 20 should receive the unobstructed beam 18 and controller 22 should receive the corresponding 20 mA signal. Likewise, the blocked signal (0 mm) should equate to 4 mA. It is to be noted that the 0–20 mA signal, which corresponds to 0–24 mm, is by way of example only. For instance, a laser assembly could be provided which arbitrarily uses 0–50 mA to correspond to 0–24 mm. Numerous other signal ranges are contemplated to accommodate various lasers from different manufacturers and/or to accommodate specific user requirements.

FIG. 3 shows the emitter 16 and receiver 20 positioned from the conveyor 12 from between about 100 millimeters to about 200 millimeters to accommodate various grades of logs L having setpoint diameters of between 125 millimeters to about 160 millimeters. To accommodate the different setpoint diameters, the emitter 16 and receiver 20 are positionally adjusted by the adjusting devices A. For instance, the emitter 16 and the receiver 20 can have adjusting bars or extensions (not shown), which are mountable in complementary slotted holes or tracks of the adjusting devices A to adjust at least gross positions of the emitter 16 and the receiver 20, either automatically or manually. The adjusting devices A are known in the art, and therefore, further detail need not be given to appreciate this aspect of the invention.

An emission aperture 16a must be disposed from between 10 mm to about 15 mm (depending on the selected height of the laser beam 18) above the setpoint diameter of the log L for the emission aperture 16a of the emitter 16 to accommodate the 20–30.5 mm laser beam 18. The 10 mm-15 mm range of the emission aperture 16a ensures that the aperture 16a is appropriately above the setpoint diameter (between 125–170 mm) such that approximately one-half of the laser beam 18 is blocked by the log L. Accordingly, as different grades of logs L are used, the aperture 16a and a vertical distance $V_d$ of the laser beam 18 as seen in FIG. 3 are automatically or manually adjusted by moving emitter 16 and receiver 20 up or down on adjusting devices A as previously described.

It is to be noted that a receiver aperture 20a of the receiver 20 is in a same horizontal plane as the emission aperture 16a; i.e., the emitter 16 and receiver 20 are shown in the Figures adjacent to the conveyor 12 and aligned in the same horizontal plane in diametric opposition to each other. However, emitter 16 and receiver 20 may be mounted in some other plane relative to one another to measure the diameter D from a different position or orientation other than in the horizontal plane. This may be desirable or necessary if a particular production floor layout requires an orientation of the laser assembly 14 in other than the horizontal plane.

Figure 4:
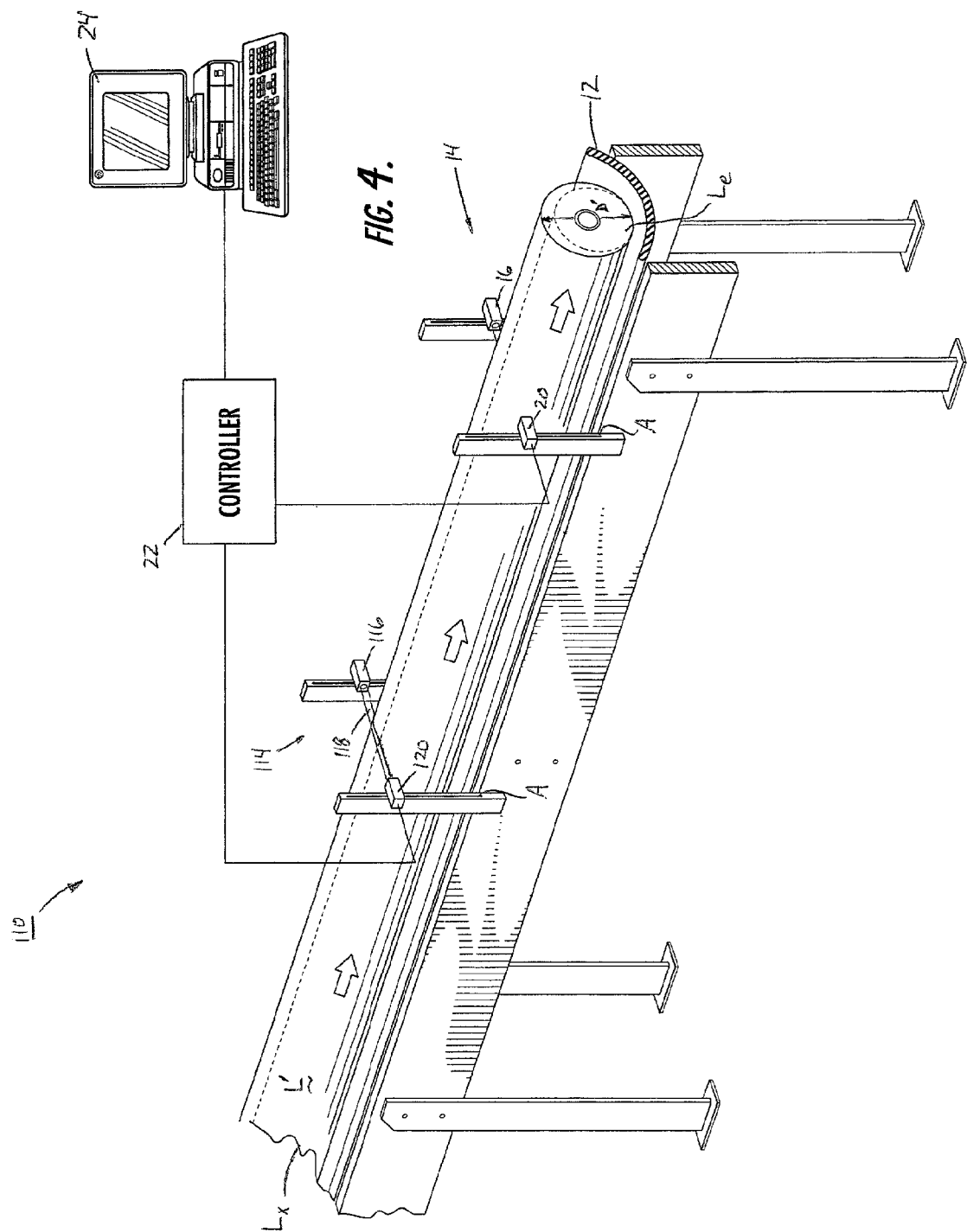
FIG. 4 illustrates an alternative embodiment of the invention in which multiple laser measuring devices are arranged for measuring logs of various sizes.

With further reference to FIGS. 1 and 4, the controller 22 is shown in controllable communication with the laser assembly 14. The controller 22 can be, for instance, an Allen-Bradley® ControlLogix™ 5555 processor available from Rockwell Automation of Milwaukee, Wis. The controller 22 is configured to command the measuring device 10 to measure the diameter D at pre-selected time intervals, such as 50, 100, or 200 millisecond intervals. Alternatively or additionally, the controller 22 may be configured to command the measuring device 10 to measure the diameter D based on a number of processed logs L. For instance, the inventors have found that between four and eight logs L provide a sufficient sampling to establish a reliable average diameter being produced by the log manufacturing equipment. However, fewer or additional logs L can be sampled by the controller 22 if required. Additionally, the controller 22 can be configured to command the measuring device 10 to bypass at least one interval measurement when, for instance, a particular log is rejected from further processing.

As introduced, the controller 22 can be programmed with an offset or target value representing the desired setpoint diameter of the log L. The offset value may be, for example, 125 millimeters up to about 170 millimeters, and is compared to measured diameters D by the controller 22. If the measured diameters D fall outside of a permissible offset value range, then in a closed-loop fashion, the controller 22 can automatically adjust a processing station in the system to alter a subsequent diameter D or other parameter in real-time, or to alert the operator that system attention is required via a winder operator panel 24, discussed below.

More specifically, the controller 22 can be programmed with a statistical process control rule to initiate a system change based on averaging a specified number of samples. Based on the average diameter, for instance, the process control rule causes the controller 22 to adjust the system in closed-loop increments or in real-time as desired. Using closed-loop feedback, the controller 22 will direct the laser assembly 14 to take an additional set of samples, and if necessary, the controller 22 will initiate another system change based on subsequent averages. To avoid corrupting the closed-loop averages, the control rule can be adapted to ignore samples, which fall outside of a valid setpoint range, or to ignore samples from logs L that are being culled.

In another inventive aspect, the laser assembly 14 is programmed to take, for instance, samples every 100 ms as the log L passes by on the conveyor 12. The controller 22 monitors and compiles a longitudinal profile of the log L from the interval measurements to determine if the logs L are being skewed end-to-end as the logs L are produced. If so, the controller 22 commands the system to adjust the calender loading on a leading and/or following log end $L_e$, $L_x$, respectively, to correct skewing in subsequent logs L, discussed further below.

In another aspect of the invention, as seen in FIGS. 1 and 4, the winder operator panel 24 briefly introduced above is in communication with the controller 22 to enable the operator to program the controller 22. The winder operator panel 24 displays the measured and setpoint parameters to the operator, and permits the operator to change the frequency of log sampling, to change the set value of the parameter, to override a line setting in the converting equipment to alter the parameter and the like. For instance, the operator can command the laser assembly 14 via the controller 22 and the winder operator panel 24 to lase the log L every 50 ms instead of every 100 ms if desired to refine the measured parameter. The winder operator panel 24 may be a touch-screen, personal, voice-activated computer or the like as known in the art.

FIG. 4 illustrates an aspect of the invention in which an alternative laser measuring device 110 is provided having a laser assembly 114 with an emitter 116 and a receiver 120 in addition to the foregoing embodiment of emitter 16 and receiver 20. Similar to the emitter 16 and receiver 20 previously described, the emitter 116 and receiver 120 are disposed apart from each other adjacent the conveyor 12. The emitters 16, 116 are in communication with and disposed diametrically opposite respective receivers 20, 120.

Also as before, emitters 16 and receiver 20 are disposed apart from the conveyor 12 from between 103 mm to about 181 mm, and more particularly, from between 126 mm to about 129 mm. Emitter 116 and receiver 120 are disposed apart from the conveyor 12 also from between 103 mm to about 181 mm, but more particularly, from between 145 mm to about to about 170 mm. In this arrangement, various grades or sizes of logs may be handled by the same system without requiring adjustments to a single laser assembly 14 if and when smaller and larger logs L are processed on the same conveyor 12.

The emitter 116 and the receiver 120 are positionally adjustable similar to emitter 16 and receiver 20 of the foregoing embodiment. This flexibility is necessary if the laser assemblies 14, 114 must "swap" log diameters D; e.g., if laser assembly 114 is to be used to monitor 120–130 mm logs L while the laser assembly 14 is to be used to monitor 150–170 mm logs L or vice-versa.

In addition to emitters 16, 116 and receivers 20, 120, it is to be noted that additional laser assemblies with additional emitters and receivers can be installed at various points in the system, along the conveyor, or on the same adjusting device A to accommodate a variety of logs L beyond the diameter range of 120–170 mm, discussed herein. Hence, the range of 120–170 mm is merely provided as an example and is not intended to limit the invention to only that size of log L.

Moreover, the emitters 16, 116 and the receivers 20, 120 may be movingly disposed about the log L to monitor a plurality of points on the log L to measure the parameter. This movable arrangement is contemplated proximate or away from the conveyor 12 such as in a staging area where the log L is stationary and awaiting transfer to storage or further processing.

Alternatively, any combination of fixed and movable emitters 16, 116, receivers 20, 120 and the log L are possible within the scope of the present invention. In one aspect, for instance, the log L, the emitters 16, 116, and the receivers 20, 120 may all be movingly disposed proximate one another such that the measuring device 110 monitors the plurality of points about the log L for measuring the parameter. More specifically, the emitters 16, 116, and the receivers 20, 120 may be operatively connected to adjusting devices A in the form of a U-shaped bracket (not shown) disposed about the conveyor 12 such that the emitters 16, 116, and the receivers 20, 120 are movable to measure any aspect of the log L as it moves along the conveyor 12. In lieu of, or in addition to adjusting devices A, the emitters 16, 116, and the receivers 20, 120 may be operatively connected to movable robotic arms (not shown) to achieve the purposes described above.

A further aspect of the invention is seen in FIGS. 1 and 4 in which a method of measuring a predetermined diameter D of a log L includes the steps of moving the log L along the conveyor 12 in a direction of the nonwoven fibrous web manufacturing machine and lasing the log L by the laser beams 18, 118 emitted from the emitters 16, 116 disposed proximate the conveyor 12. Similar to the foregoing embodiments, the first portion 18a of the laser beam 18 is blocked by the paper log L while a second portion 18b of the laser beam 18 is received by a receiver 20 disposed apart from the emitter 16 such that the paper log L passes longitudinally between the receiver 20 and the emitter 16. Further steps include converting the second portion 18b into the diameter D and closed-loop adjusting a line setting in the web manufacturing machine to adjust the diameter D.

Also according to the method in FIGS. 1 and 4, the log L has an entry end $L_e$ and an exit end $L_x$. The log L is arranged in a stable horizontal plane on the conveyor 12 from a point where the entry end $L_e$ passes the emitter 16 to a point where the exit end $L_x$ passes the emitter 16. The lasing step is repeated in set intervals, such as every 100 ms, from the entry end $L_e$ to the exit end $L_x$. Accordingly, the controller 22 is able to monitor the longitudinal profile of the log L to determine if the log L is being formed skewed; e.g., where end $L_e$ is larger than end $L_x$. The closed-loop adjusting step then occurs automatically to adjust the log such that the skew is corrected and a uniform product is produced.

It will be apparent to those skilled in the art that various modifications and variations can be made in the present invention without departing from the scope and spirit of the invention. For example, specific shapes, quantities, and arrangements of various elements of the illustrated embodiments may be altered to suit particular applications. It is intended that the present invention include such modifications and variations as come within the scope of the appended claims and their equivalents.

That which is claimed is:

1. A measurement system for measuring a parameter of a log of web material, the measurement system comprising:
   a measuring device configured to produce an emission in a direction of the log, a portion of the emission adapted for obstruction by the log, a remainder of the emission convertible into the parameter; and
   a controller in communication with the measuring device, the controller configured to receive the parameter and adjust formation of a subsequent log in response to the received parameter.

2. The measuring system of claim 1, wherein the parameter is a diameter.

3. The measuring system of claim 1, wherein the parameter is a profile of the log taken in a direction substantially perpendicular to the moving direction of the log.

4. The measuring system of claim 1, wherein the measuring device is movingly disposed about the log of web material, the measuring device configured to monitor a plurality of points about the log of web material to measure the parameter.

5. The measuring system of claim 1, wherein the measuring device is fixed relative to the log of web material, the log of web material movingly disposed proximate the measuring device, the measuring device configured to monitor a plurality of points about the log of web material to measure the parameter as the log of web material passes the measuring device.

6. The measuring system of claim 1, wherein the measuring device is a laser system.

7. The measuring system of claim 6, wherein the laser system is an emitter and a receiver disposed apart from each other adjacent a conveyor, the emitter and the receiver in interruptible communication with each other.

8. The measuring system of claim 7, wherein the emitter emits a laser beam, a part of the laser beam blockable by a height of the log, an unblocked remainder of the laser beam received by the receiver and convertible to the parameter.

9. The measuring system of claim 8, wherein the laser beam defines a height of between 20 millimeters to about 30.5 millimeters.

10. The measuring system of claim 8, wherein the emitter is disposed apart from the conveyor from between 103 millimeters to about 181 millimeters.

11. The measuring system of claim 10, wherein the emitter is disposed apart from the conveyor from between 145 millimeters to about 170 millimeters.

12. The measuring system of claim 8, wherein the log defines a setpoint diameter of between 125 millimeters to about 160 millimeters.

13. The measuring system of claim 7, wherein the emitter and the receiver are mounted in a horizontal plane such that the emitter and receiver are aligned in diametric opposition.

14. The measuring system of claim 7, wherein the emitter is a plurality of emitters and the receiver is a plurality of receivers disposed diametrically opposite and apart from each other adjacent the conveyor, one each of the emitters in interruptible communication with one each of the receivers.

15. The measuring system of claim 14, wherein at least one of the plurality of emitters and at least one of the plurality of receivers are disposed apart from the conveyor from between 126 millimeters to about 129 millimeters and at least another of the plurality of emitters and at least another of the plurality of receivers are disposed apart from the conveyor from between 145 millimeters to about 170 millimeters.

16. The measuring system of claim 7, wherein the emitter and the receiver are adjustable.

17. The measuring system of claim 6, wherein the laser system is configured to send a first predetermined signal to the controller when no portion of the emission is obstructed by the log.

18. The measuring system of claim 17, wherein the first predetermined signal is a 20 milliamp signal, the 20 milliamp signal equivalent to a 24 millimeter laser beam height.

19. The measuring system of claim 6, wherein the laser system is configured to send a second predetermined signal to the controller when the emission is entirely blocked.

20. The measuring system of claim 19, wherein the second predetermined signal is a 4 milliamp signal, the 4 milliamp signal equivalent to a 0 millimeter laser beam height.

21. The measuring system of claim 1, wherein the controller is programmable to adjust the formation of the subsequent log in response to the received parameter.

22. The measuring system of claim 21, wherein the controller is configured to be programmed with a statistical process control rule for adjusting the formation of the subsequent log.

23. The measuring system of claim 22, wherein the control rule is configured to automatically adjust the formation of the subsequent log incrementally or in real-time.

24. The measuring system of claim 22, wherein the control rule is selected from the group consisting of modifying a log calender loading, a log sheet tension, a winding log speed profile, and combinations thereof to adjust the parameter.

25. The measuring system of claim 21, wherein the controller is configured to be programmed with an offset value representing a desired diameter of the log.

26. The measuring system of claim 25, wherein the offset value is from between about 120 millimeters to about 170 millimeters.

27. The measuring system of claim 21, wherein the controller is configured to command the measuring device to measure the parameter at a pre-selected interval.

28. The measuring system of claim 27, wherein the controller is configured to command the measuring device to bypass an interval measurement when the log is rejected for further processing.

29. The measuring system of claim 27, wherein the parameter is a plurality of parameters, the controller configured to command the measuring device to measure the plurality of parameters at a plurality of pre-selected intervals across a plurality of logs.

30. The measuring system of claim 29, wherein the controller is configured to produce an average of the plurality of parameters.

31. The measuring system of claim 30, wherein the plurality of logs is between one (1) and twelve (12).

32. The measuring system of claim 1, further comprising a winder operator panel in communication with the controller.

33. The measuring system of claim 32, wherein the winder operator panel is configured to display the parameter.

34. The measuring system of claim 33, wherein the winder operator panel is configured for programming the controller.

35. The measuring system of claim 34, wherein the winder operator panel is configured to modify the group consisting of changing a frequency of emission sampling, changing a set value of the parameter, overriding the parameter and combinations thereof.

36. A laser measurement system for measuring a parameter of a log of web material in a packaging machine, the laser measurement system comprising:
    an emitter disposed proximate the log of web material, the emitter configured to emit a laser beam in a direction of the log for measuring the log without contact, a first portion of the laser beam blockable by a portion of the log;
    a receiver disposed apart from the emitter such that the log is movably disposed between the receiver and the emitter, the receiver configured to receive a second portion of the laser beam and convert the second portion into the parameter; and
    a controller in communication with the emitter and receiver, the controller configured to receive the parameter and provide a closed-loop control of a subsequent parameter of a subsequent log of web material.

37. The laser measurement system of claim 36, wherein an emission aperture of the emitter is disposed from between 10 millimeters to about 15 millimeters above a diameter setpoint of the log.

38. The laser measurement system of claim 37, wherein a receiver aperture of the receiver is in a same horizontal plane as the emission aperture.

39. The laser measurement system of claim 37, wherein the laser beam has a height of between 20 millimeters to about 30.5 millimeters.

40. The laser measurement system of claim 36, wherein the second portion is convertible into a milliamperage signal for communication of the parameter to the controller.

41. The laser measurement system of claim 40, wherein the emitter is configured to adjust the signal.

42. A method for measuring a log in a nonwoven fibrous web manufacturing machine having a setpoint diameter, the method comprising the steps of:
    lasing the log by a laser light emitted from an emitter, a first portion of the laser light blocked by the log, a second portion of the laser light received by a receiver disposed apart from the emitter;
    converting the first and second portions into a measured diameter;
    comparing the setpoint diameter to the measured diameter; and
    closed loop adjusting a finishing station line setting in the web manufacturing machine to adjust the measured diameter when the measured diameter is different from the setpoint diameter.

43. The method of claim 42, wherein the laser light has a height of between 20 millimeters to about 30.5 millimeters.

44. The method of claim 43, wherein the setpoint diameter is reached when approximately one-half of the laser light height is blocked by the log.

45. The method of claim 42, wherein the log has an entry end and an exit end, the log arranged in a stable horizontal plane on a conveyor from a point where the entry end passes the emitter to a point where the exit end passes the emitter, the lasing step repeated intermittently from the entry end to the exit end.

46. The method of claim 45, wherein the lasing step is repeated at between 50 millisecond to about 150 millisecond intervals from the entry end to the exit end.

47. The method of claim 42, wherein the closed-loop adjusting step occurs automatically to adjust the log diameter.

48. A laser measurement system for measuring a parameter of a log disposed on a conveyor in a packaging machine adjustably controlled by a controller, the laser measurement system comprising:
    an emitter disposed proximate the log and configured to emit a laser beam in a direction of the log, a first portion of the laser beam arranged to be blocked by a part of the log for measuring the log; and a receiver disposed apart from the emitter such that the log is movably disposed between the receiver and the emitter, the receiver configured to receive the second portion of the laser beam for conversion into the parameter, wherein the controller is in communication with the emitter and the receiver, the controller configured to receive the parameter and provide a closed-loop control of a subsequent parameter.

49. The laser measurement system of claim 48, further comprising the controller.

50. The laser measurement system of claim 48, wherein the laser beam is adapted to not penetrate the log.

* * * * *